March 14, 1939.    A. GODDARD    2,150,372
FILM PACKET FOR CAMERAS
Filed March 5, 1936
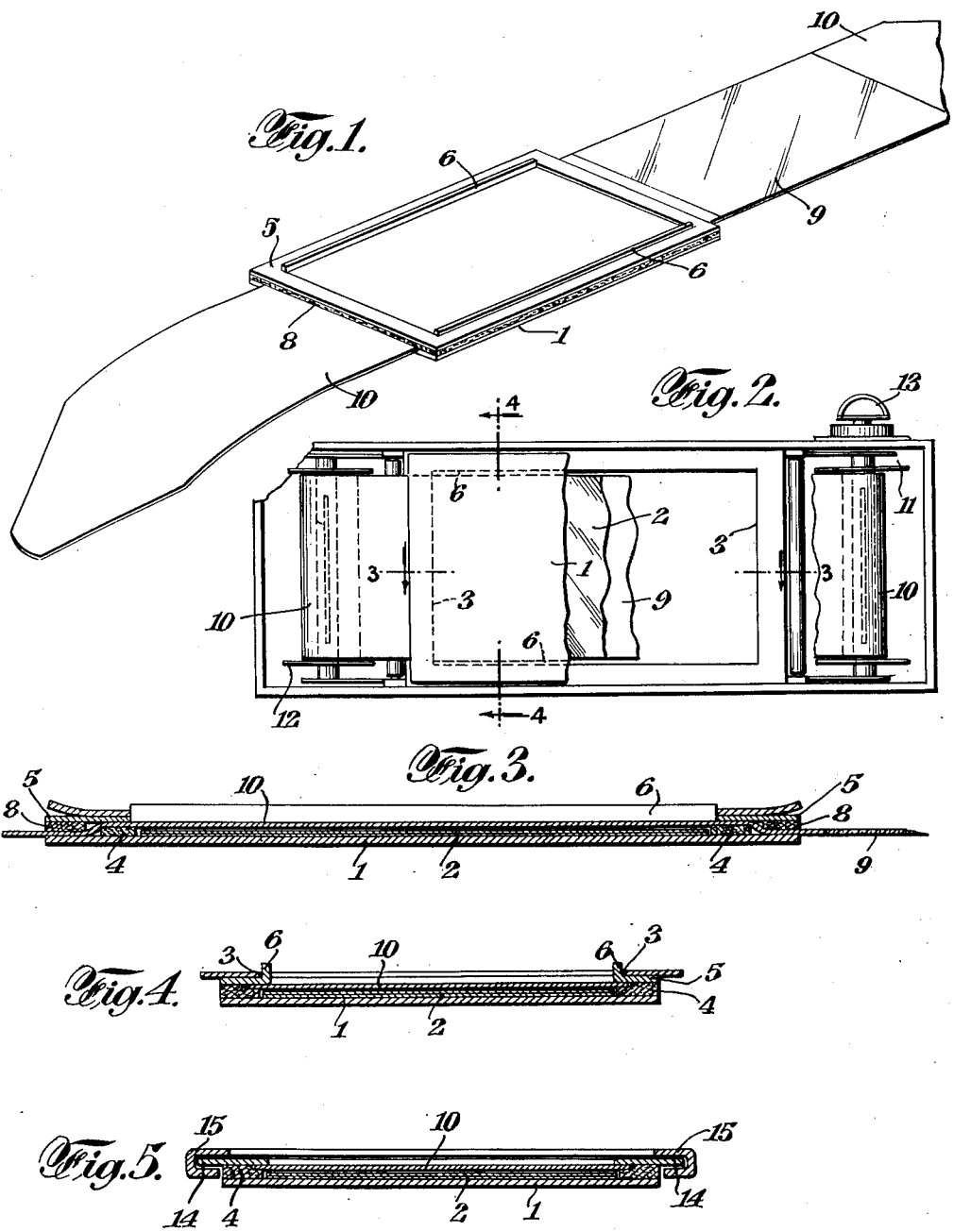
INVENTOR
Anne Goddard Patented Mar. 14, 1939

2,150,372

UNITED STATES PATENT OFFICE 2,150,372

FILM PACKET FOR CAMERAS

Anne Goddard, New York, N. Y., assignor, by direct and mesne assignments, of thirty per cent to Tomas Pacanins, New York, N. Y., and fifteen per cent to Florencio Gomez Application March 5, 1936, Serial No. 67,276

2 Claims. (Cl. 95—72)

The present invention relates to photographic apparatus and, generically considered, has for its primary object and purpose to provide a simple and inexpensive photographic pack or unit which may be interchangeably used with the film roll of a conventional roll film type camera for the purpose of making a single exposure, when desired, which may be immediately developed and printed. Thus my invention materially increases the utility of cameras of this type, and in effect converts the same into a combination roll film and a plate type camera.

Another object of the invention is to provide an improved construction of frame or holder for the photographically sensitized material having means for retaining and guiding a rectilinearly movable shutter in light excluding contact therewith, but without appreciable resistance to the free sliding movement of the shutter relative to said holder.

Another important object of the invention is to provide the holder or frame with means for positioning said holder relative to the light aperture of the camera and effectively preventing displacement of the holder from such position, in the movement of the shutter through said holder.

A further object of my invention is to provide a novel form of shutter comprising a length of thin flexible material having longitudinally spaced opaque sections and an intermediate, light transmitting, section.

With the above and other objects in view, the invention consists in the improved photographic apparatus and in the form construction and relative arrangement of its several parts, as will be herein more fully described, illustrated in the accompanying drawing and subsequently incorporated in the subjoined claims.

In the drawing wherein I have illustrated several simple and practical embodiments of my invention and in which similar reference characters designate corresponding parts throughout the several views:

Fig. 1 is a perspective view illustrating one practical embodiment of my improved photographic pack or unit.

Fig. 2 is a plan view showing the invention as applied to a roll film type camera, certain of the parts being broken away.

Fig. 3 is a longitudinal sectional view taken substantially on the line 3—3 of Fig. 2.

Fig. 4 is a transverse sectional view taken on the line 4—4 of Fig. 2, and,

Fig. 5 is a sectional view similar to Fig. 4 showing the invention as applied to a plate type camera.

My invention as illustrated in Fig. 1, is adapted for application to the conventional type of roll film camera, which, as shown in Fig. 2, is provided with the usual light aperture 3 through which the image-bearing light rays are projected from the objective lens of the camera upon the sensitized photographic film. Also in opposite ends of the camera case, the usual film supply spool 12 and take-up spool 11 are mounted, the latter being provided with the operating key 13.

My new photographic pack or unit which may be interchangeably substituted for the film roll, includes a base 1 of cardboard, sheet metal or other comparatively light rigid material. To one side of this base a mask 4 of yieldable light-impervious material, such as black cloth, felt or the like, is attached. This mask is of somewhat less length than the base 1 so that opposite end portions of said base extend beyond the ends of the mask as clearly shown in Fig. 3 of the drawing. Within the aperture of the mask 4, the sheet of photographically sensitized material 2 is positioned upon the base 1.

A second mask 5 which may be of the same material as the base 1 and of substantially the same dimensions, is positioned upon the mask 4 and suitably attached along its longitudinal side edges thereto. The ends of the mask 5 therefore project beyond the ends of the mask 4 and to said projecting ends, in opposed relation to the base 1, the strips 8 are attached. These strips are of yieldable, light-impervious material similar to the mask 4 and are slightly spaced from the ends of said mask, as clearly seen in Fig. 3, to provide narrow passages for a flexible shutter which will now be described. The inner side edges of the mask 5 are provided with ribs or flanges 6 of substantially equal length to the aperture 3.

The improved shutter comprises a suitable length of thin flexible material and includes the longitudinally spaced opaque sections 10 and an intermediate transparent or translucent section 9, which may constitute a filter for the transmission of colored light rays. Each of these shutter sections has an area which is at least substantially equal to the area of the aperture of the film mask 5. One or both ends of this flexible shutter may be tapered in width, as indicated in Fig. 1 of the drawing, for convenient use in the roll film camera. The shutter may be made from Cellophane, Celluloid or gelatine, and the parts 10 suitably treated to render the same opaque, or the section 9 only made from such material, while the opaque portions 10 may be of paper or other opaque material and suitably connected with the ends of the section 9.

As clearly shown in Fig. 3 of the drawing, the flexible shutter extends over the mask 4 and the sensitized material 2 and under the strips 8, between the latter and the ends of the base 1. These strips constitute light seals and exert a yielding pressure directly against the flexible shutter. This shutter moves in an undulating path through the passages between the sealing strips 8 and the mask 4. Since the light rays can only move in a straight line, entrance of light at the ends of the frame or holder is thus effectually precluded and the sensitized material 2 properly protected when covered by one of the opaque sections 10 of the shutter.

When it is desired to make a single exposure in a roll film camera for immediate developing and printing, the camera case is opened and the film roll removed. My improved photographic pack is then arranged in position with the ribs or flanges 6 projecting through the light opening 3 at its side edges as seen in Fig. 4. One end of the flexible shutter is connected to the take-up spool 11 while the other end portion and the light transmitting section 9 of the shutter are wound upon the spool 12. However, if desired this spool may be removed and the latter portions of the shutter merely arranged in a loose coil in the end of the camera case. Upon closing the camera the frame is securely held in operative position. The camera is provided with the usual signalling means, such, for instance, as a distinctively colored portion of one of the opaque sections 10 adapted to register with an opening in the camera case upon turning of the take-up spool 11 to thus apprise the operator that the section 9 of the shutter is in position for exposure of the sensitized material 2. After the exposure has been made, spool 11 is again rotated by means of the key 13 so that another opaque section of the shutter is positioned over the exposed photographic material 2. The device may then be removed from the camera case and the material 2 removed from the frame or holder for immediate processing.

In Fig. 5 of the drawing I have shown a slightly modified form of my invention for use in a plate type camera. The camera is provided with the usual vertical guides, indicated at 15, to receive the plate holder. The mask 5 of my device above referred to is of slightly greater width so that the opposite side edges thereof project beyond the side edges of the base to provide the extensions 14 to be received in the guides 15. Also in this case, the ribs or flanges 6 at the inner side edges of the mask are omitted. The flexible shutter is operated by hand, preferably by pulling the same downwardly through the frame or holder, and the operator may easily observe when the light transmitting section of the shutter is positioned over the sensitized material 2.

From the above description it will be seen that my improved photographic pack or unit is admirably adapted for interchangeable use with the film roll of the inexpensive conventional roll film type camera and without necessitating any structural alterations of the latter. The device is easily and quickly applicable to its operative position and obviates the necessity of using adaptors or other extraneous devices for holding the frame against displacement relative to the light aperture of the camera in the rectilinear movement of the flexible shutter. Also while very efficient means is provided for insuring a light tight seal of the frame at its opposite ends, the flexible shutter is easily movable therethrough without appreciable resistance.

It will be noted that all of the parts employed in the construction of my invention are of light cheap materials which is an important consideration in accomplishing the intended purpose, viz., to provide a device of this kind which may be profitably manufactured and sold at low cost for interchangeable use with the film roll of the ordinary inexpensive and well-known roll film camera. It will be further appreciated that the flexible shutter above described, may also be advantageously used in connection with various other types of photographic frames or holders, and in view of its very simple construction may be separately manufactured and sold at nominal cost.

In the foregoing description and the accompanying drawing I have described and illustrated several embodiments of my present invention which have proved highly practical in actual use. However, it is apparent that in the adaptation of my invention for use in connection with various makes or types of cameras, modifications in detail may be required. Accordingly it is to be understood that I reserve the privilege of resorting to all such legitimate changes in the form, construction and relative arrangement of the several parts of the invention, as may be fairly comprehended within the spirit and scope of the appended claims.

I claim:

1. A sensitized material holder adapted for use in roll film cameras said holder comprising a frame adapted to fit within the film gate of the camera and having means adapted to support it in position therein, said frame having a back against the front face of which the sensitized material may be placed, means in the holder for holding such sensitized material in position, said frame having a light-sealed passageway at each end and a guide way at each side connecting said passageways, a flexible dark slide for said holder, said dark slide comprising two flexible opaque end sections and an intermediate transparent section, said dark slide extending through said light sealed passageways and guide ways and in front of said sensitized material, the first opaque end of said dark slide being of sufficient length to fully shield the sensitized material from light and to extend to and connect with the take-up spool of the camera, the transparent section being of a length at least equal to the length of the sensitized material and the second opaque section being of a length sufficient to fully protect the sensitized material from light when drawn into operative position.

2. A sensitized material holder adapted for use in photographic cameras, said holder comprising a frame adapted to fit in the film gate structure of the camera and having means adapted to support it in operative position therein, said frame having a back against the front face of which the sensitized material may be placed, means in the holder for holding such sensitized material in position, said frame having a light sealed passageway at each end and a guide way at each side connecting said passageways, a flexible dark slide for said holder, said dark slide comprising two flexible opaque end sections and an intermediate transparent section, said transparent section made of a flexible continuous transparent material susceptible of being colored, said dark slide extending through said light sealed passageways and guide ways and in front of the space where the sensitized material is held in said holder, the first opaque end of said dark slide being of sufficient length to fully shield the sensitized material from light plus the additional length necessary to be operated in the camera, the transparent section being of a length at least equal to the length of the sensitized material and the second opaque section being of a length sufficient to fully protect the sensitized material from light when drawn into operative position, the transparent colorable section of said dark slide further presenting the possibility of providing a color filter substantially at the focal plane of the exposure, and the continuous structure of the material forming said transparent section giving the dark slide enough consistency for a safe operation and a light transmitting area of full width and capable of completely exposing the maximum surface of sensitized material loaded in said holder.

ANNE GODDARD.